(12) United States Patent
Kim et al.

(10) Patent No.: US 10,963,792 B1
(45) Date of Patent: Mar. 30, 2021

(54) METHOD FOR TRAINING DEEP LEARNING NETWORK BASED ON ARTIFICIAL INTELLIGENCE AND LEARNING DEVICE USING THE SAME

(71) Applicant: Stradvision, Inc., Pohang-si (KR)

(72) Inventors: Kye-Hyeon Kim, Seoul (KR); Hongmo Je, Pohang-si (KR); Bongnam Kang, Pohang-si (KR); Wooju Ryu, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 17/111,539

(22) Filed: Dec. 4, 2020

Related U.S. Application Data (60) Provisional application No. 63/000,202, filed on Mar. 26, 2020.

(51) Int. Cl.
*G06N 3/00* (2006.01)
*G06N 3/08* (2006.01)
*G06K 9/62* (2006.01)

(52) U.S. Cl.
CPC ........... *G06N 3/084* (2013.01); *G06K 9/6202* (2013.01); *G06K 9/623* (2013.01); *G06K 9/6259* (2013.01); *G06K 9/6262* (2013.01)

(58) Field of Classification Search
CPC combination set(s) only.
See application file for complete search history.

(56) References Cited

U.S. PATENT DOCUMENTS

2018/0357753 A1* 12/2018 Lehtinen .................. G06N 3/08

* cited by examiner

*Primary Examiner* — Iman K Kholdebarin
(74) *Attorney, Agent, or Firm* — Xsensus LLP (57) ABSTRACT

A method for training a deep learning network based on artificial intelligence is provided. The method includes steps of: a learning device (a) inputting unlabeled data into an active learning network to acquire sub unlabeled data and inputting the sub unlabeled data into an auto labeling network to generate new labeled data; (b) allowing a continual learning network to sample the new labeled data and existing labeled data to generate a mini-batch, and train the existing learning network using the mini-batch to acquire a trained learning network, wherein part of the mini-batch are selected by referring to specific existing losses; and (c) (i) allowing an explainable analysis network to generate insightful results on validation data and transmit the insightful results to a human engineer to transmit an analysis of the trained learning network and (ii) modifying at least one of the active learning network and the continual learning network.

18 Claims, 8 Drawing Sheets
(1 of 8 Drawing Sheet(s) Filed in Color)

METHOD FOR TRAINING DEEP LEARNING NETWORK BASED ON ARTIFICIAL INTELLIGENCE AND LEARNING DEVICE USING THE SAME

CROSS REFERENCE TO RELATED APPLICATION

This application claims the benefit of U.S. Provisional Application No. 63/000,202, filed on Mar. 26, 2020, the entire contents of which being incorporated herein by reference.

FIELD OF THE DISCLOSURE

The present disclosure relates to a method for training a deep learning network and a learning device using the same; and more particularly, to the method for training the deep learning network based on artificial intelligence and the learning device using the same.

BACKGROUND OF THE DISCLOSURE

Recently, methods of performing object identification and the like making use of machine learning are being studied.

Deep learning, which is one type of the machine learning, uses a neural network with several hidden layers between an input layer and an output layer, and shows high performance in recognition.

And, the neural network using the deep learning generally is trained through backpropagation using losses.

In order to train such a deep learning network, conventionally, raw data is collected according to a data collection policy, and human labelers annotate the collected raw data to generate new training data. After that, the deep learning network is trained by using the new training data and existing training data. Then, human engineers modify and improve learning algorithms to be used for training the deep learning network, by referring to an analysis result on performance. In addition, the data collection policy is changed by referring to the analysis result, and re-examination is performed as to whether there is any wrong annotation, and modification is performed accordingly.

However, in the conventional method as such, as the performance of the deep learning network improves, hard example useful for training becomes scarce, and thus an effect of improving the performance of the deep learning network using the new training data is reduced, and return on investment on the data annotation by the human labelers is reduced.

In addition, in the conventional method, if the new training data annotated by the human labelers and the existing training data are used at a fixed ratio, then an amount of the existing training data gradually increases, and accordingly, the learning effect of the deep learning network using the new training data is gradually reduced.

Also, in the conventional method, it is impossible to know which part of the learning model, such as a learning algorithm, a data collection policy, training data, etc. causes problems and needs to be improved, only from results on the performance analysis by the human engineers. That is, an inefficient trial and error of comparing performance by changing a tiny element is required, or tracing each result of the trained deep learning network back to the cause to find out the root cause is required, therefore the experience and judgment of the costly human engineers are required.

SUMMARY OF THE DISCLOSURE

It is an object of the present disclosure to solve all the aforementioned problems.

It is another object of the present disclosure to increase return on investment on data annotation.

It is still another object of the present disclosure to improve learning effect of a deep learning network using new training data.

It is still yet another object of the present disclosure to provide insightful information to be used for performance analysis from outputs of a trained deep learning network.

It is still yet another object of the present disclosure to minimize human intervention in training the deep learning network.

In accordance with one aspect of the present disclosure, there is provided a method for training a deep learning network based on artificial intelligence, including steps of: (a) a learning device performing or supporting another device to perform a process of inputting unlabeled data into an active learning network, to thereby allow the active learning network to acquire sub unlabeled data, estimated as hard examples to be used for training an existing learning network, from the unlabeled data wherein the existing learning network has been trained with existing labeled data and a process of inputting the sub unlabeled data into an auto labeling network, to thereby allow the auto labeling network to label each piece of the sub unlabeled data and thus to generate new labeled data; (b) the learning device performing or supporting another device to perform a process of allowing a continual learning network to (i) sample the new labeled data and the existing labeled data, to thereby generate a mini-batch including sampled new labeled data and specific sampled existing labeled data, and (ii) train the existing learning network by using the mini-batch, to thereby acquire a trained learning network, wherein the specific sampled existing labeled data are selected among the sampled existing labeled data by referring to a condition of each of specific existing losses corresponding to the specific sampled existing labeled data being equal to or greater than a preset base loss; and (c) the learning device performing or supporting another device to perform (i) a process of allowing an explainable analysis network to (i-1) generate insightful results on validation data via the trained learning network and (i-2) transmit the insightful results to at least one human engineer, to thereby allow the human engineer to transmit an analysis, created by referring to the insightful results, of the trained learning network to the learning device and (ii) a process of modifying and improving at least one of the active learning network and the continual learning network by referring to the analysis.

As one example, at the step of (a), the learning device performs or supports another device to perform a process of allowing the auto labeling network to (i) label each piece of the sub unlabeled data, to thereby generate intermediate labeled data, (ii) estimate each of uncertainty scores of each piece of the sub labeled data, to thereby calculate one or more predicted losses, (iii) transmit first intermediate labeled data, whose corresponding predicted losses are equal to or greater than a loss threshold, among the intermediate labeled data to at least one human labeler, to thereby allow the human labeler to verify the transmitted first intermediate labeled data and thus to generate verified labeled data, and (iv) acquire the verified labeled data and second intermediate labeled data, whose predicted losses are less than the loss threshold, as the new labeled data.

As one example, the learning device has performed or supported another device to perform (i) a process of inputting training data into the auto labeling network, to thereby allow the auto labeling network to (i-1) label the training data and thus generate labeled training data and (i-2) estimate each of uncertainty scores for training on each piece of the training data and thus calculate one or more predicted losses for training and (ii) a process of backpropagating (1) one or more labeling losses for training calculated by referring to the labeled training data and their corresponding ground truths and (2) one or more loss prediction errors created by referring to differences between the labeling losses for training and their corresponding predicted losses for training, to thereby train the auto labeling network.

As one example, the learning device performs or supports another device to perform a process of continual learning of the auto labeling network using one or more accuracy losses calculated by referring to the verified labeled data and the first intermediate labeled data.

As one example, at the step of (b), on condition that an averaged loss, calculated by averaging one or more existing losses on existing output information, has been acquired as the base loss and wherein the existing learning network creates the existing output information from the existing labeled data, the learning device performs or supports another device to perform a process of allowing the continual learning network to (i) generate the mini-batch such that a ratio of the number of pieces of the sampled new labeled data to the number of pieces of the specific sampled existing labeled data is 1:1 and (ii) (ii-1) train the existing learning network using all of new losses calculated by referring to sampled new output information wherein the existing learning network creates the sampled new output information from the sampled new labeled data and (ii-2) train the existing learning network only using the specific existing losses, wherein the specific existing losses, among the existing losses, are calculated by referring to sampled existing output information and wherein the existing learning network creates the sampled existing output information from the specific sampled existing labeled data.

As one example, at the step of (c), the learning device performs or supports another device to perform a process of allowing the explainable analysis network to execute relevance estimation of validation output information created from the validation data by the trained learning network and thus to generate pixel-wise explanations, to thereby acquire the pixel-wise explanations as the insightful results.

As one example, at the step of (a), the learning device performs or supports another device to perform a process of allowing the active learning network to (i) compare first labeling information created from the unlabeled data by the auto labeling network with second labeling information created from the unlabeled data by the existing learning network and thus (ii) acquire specific unlabeled data, corresponding to specific differences, as the sub unlabeled data wherein the specific differences, among differences between the first labeling information and the second labeling information, are equal to or greater than a difference threshold.

As one example, at the step of (a), the learning device performs or supports another device to perform (i) a process of converting each piece of the unlabeled data into each piece of first modified unlabeled data to n-th modified unlabeled data respectively via a first modifying procedure to an n-th modifying procedure and (ii) a process of inputting each piece of the first modified unlabeled data to the n-th modified unlabeled data into the active learning network, to thereby allow the active learning network to (ii-1) measure each of variances among respective pieces of first modified output information to n-th modified output information created from respective pieces of the first modified unlabeled data to the n-th modified unlabeled data by the existing learning network and (ii-2) acquire specific unlabeled data, corresponding to specific variances, as the sub unlabeled data wherein the specific variances, among the variances, are equal to or greater than a variance threshold.

As one example, at the step of (a), the learning device performs or supports another device to perform a process of allowing the active learning network to measure each of confidence scores of each piece of the unlabeled data via the existing learning network, to thereby acquire a preset number of pieces of specific unlabeled data, counted in an increasing order of the confidence scores, as the sub unlabeled data.

In accordance with another aspect of the present disclosure, there is provided a learning device for training a deep learning network based on artificial intelligence, including: at least one memory that stores instructions; and at least one processor configured to execute the instructions to perform or support another device to perform: (I) a process of inputting unlabeled data into an active learning network, to thereby allow the active learning network to acquire sub unlabeled data, estimated as hard examples to be used for training an existing learning network, from the unlabeled data wherein the existing learning network has been trained with existing labeled data and a process of inputting the sub unlabeled data into an auto labeling network, to thereby allow the auto labeling network to label each piece of the sub unlabeled data and thus to generate new labeled data, (II) a process of allowing a continual learning network to (i) sample the new labeled data and the existing labeled data, to thereby generate a mini-batch including sampled new labeled data and specific sampled existing labeled data, and (ii) train the existing learning network by using the mini-batch, to thereby acquire a trained learning network, wherein the specific sampled existing labeled data are selected among the sampled existing labeled data by referring to a condition of each of specific existing losses corresponding to the specific sampled existing labeled data being equal to or greater than a preset base loss, and (III) (i) a process of allowing an explainable analysis network to (i-1) generate insightful results on validation data via the trained learning network and (i-2) transmit the insightful results to at least one human engineer, to thereby allow the human engineer to transmit an analysis, created by referring to the insightful results, of the trained learning network to the learning device and (ii) a process of modifying and improving at least one of the active learning network and the continual learning network by referring to the analysis.

As one example, at the process of (I), the processor performs or supports another device to perform a process of allowing the auto labeling network to (i) label each piece of the sub unlabeled data, to thereby generate intermediate labeled data, (ii) estimate each of uncertainty scores of each piece of the sub labeled data, to thereby calculate one or more predicted losses, (iii) transmit first intermediate labeled data, whose corresponding predicted losses are equal to or greater than a loss threshold, among the intermediate labeled data to at least one human labeler, to thereby allow the human labeler to verify the transmitted first intermediate labeled data and thus to generate verified labeled data, and (iv) acquire the verified labeled data and second intermediate labeled data, whose predicted losses are less than the loss threshold, as the new labeled data.

As one example, the processor has performed or supported another device to perform (i) a process of inputting training data into the auto labeling network, to thereby allow the auto labeling network to (i-1) label the training data and thus generate labeled training data and (i-2) estimate each of uncertainty scores for training on each piece of the training data and thus calculate one or more predicted losses for training and (ii) a process of backpropagating (1) one or more labeling losses for training calculated by referring to the labeled training data and their corresponding ground truths and (2) one or more loss prediction errors created by referring to differences between the labeling losses for training and their corresponding predicted losses for training, to thereby train the auto labeling network.

As one example, the processor performs or supports another device to perform a process of continual learning of the auto labeling network using one or more accuracy losses calculated by referring to the verified labeled data and the first intermediate labeled data.

As one example, at the process of (II), on condition that an averaged loss, calculated by averaging one or more existing losses on existing output information, has been acquired as the base loss and wherein the existing learning network creates the existing output information from the existing labeled data, the processor performs or supports another device to perform a process of allowing the continual learning network to (i) generate the mini-batch such that a ratio of the number of pieces of the sampled new labeled data to the number of pieces of the specific sampled existing labeled data is 1:1 and (ii) (ii-1) train the existing learning network using all of new losses calculated by referring to sampled new output information wherein the existing learning network creates the sampled new output information from the sampled new labeled data and (ii-2) train the existing learning network only using the specific existing losses, wherein the specific existing losses, among the existing losses, are calculated by referring to sampled existing output information and wherein the existing learning network creates the sampled existing output information from the specific sampled existing labeled data.

As one example, at the process of (III), the processor performs or supports another device to perform a process of allowing the explainable analysis network to execute relevance estimation of validation output information created from the validation data by the trained learning network and thus to generate pixel-wise explanations, to thereby acquire the pixel-wise explanations as the insightful results.

As one example, at the process of (I), the processor performs or supports another device to perform a process of allowing the active learning network to (i) compare first labeling information created from the unlabeled data by the auto labeling network with second labeling information created from the unlabeled data by the existing learning network and thus (ii) acquire specific unlabeled data, corresponding to specific differences, as the sub unlabeled data wherein the specific differences, among differences between the first labeling information and the second labeling information, are equal to or greater than a difference threshold.

As one example, at the process of (I), the processor performs or supports another device to perform (i) a process of converting each piece of the unlabeled data into each piece of first modified unlabeled data to n-th modified unlabeled data respectively via a first modifying procedure to an n-th modifying procedure and (ii) a process of inputting each piece of the first modified unlabeled data to the n-th modified unlabeled data into the active learning network, to thereby allow the active learning network to (ii-1) measure each of variances among respective pieces of first modified output information to n-th modified output information created from respective pieces of the first modified unlabeled data to the n-th modified unlabeled data by the existing learning network and (ii-2) acquire specific unlabeled data, corresponding to specific variances, as the sub unlabeled data wherein the specific variances, among the variances, are equal to or greater than a variance threshold.

As one example, at the process of (I), the processor performs or supports another device to perform a process of allowing the active learning network to measure each of confidence scores of each piece of the unlabeled data via the existing learning network, to thereby acquire a preset number of pieces of specific unlabeled data, counted in an increasing order of the confidence scores, as the sub unlabeled data.

In addition, recordable media readable by a computer for storing a computer program to execute the method of the present disclosure is further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

To allow those skilled in the art to carry out the present disclosure easily, the example embodiments of the present disclosure by referring to attached diagrams will be explained in detail as shown below.

Figure 1:
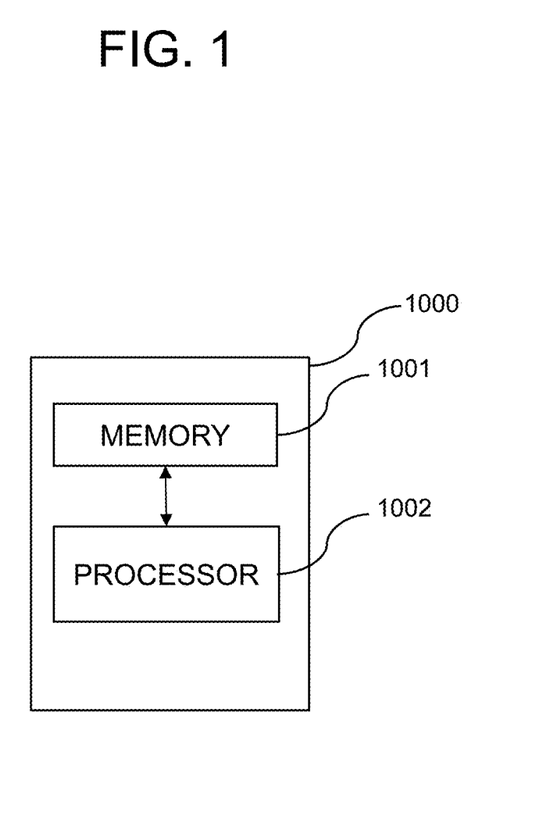
FIG. 1 is a drawing schematically illustrating a learning device for training a deep learning network based on artificial intelligence in accordance with one example embodiment of the present disclosure.

FIG. 1 is a drawing schematically illustrating a learning device for training a deep learning network based on artificial intelligence in accordance with one example embodiment of the present disclosure. By referring to FIG. 1, the learning device 1000 may include a memory 1001 for storing instructions to train the deep learning network based on the artificial intelligence and a processor 1002 for performing processes corresponding to the instructions in the memory 1001 to train the deep learning network based on the artificial intelligence.

Specifically, the learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, such description of the computing device does not exclude an integrated device including any combination of a processor, a memory, a medium, or any other computing components for implementing the present disclosure.

A method for training the deep learning network by using the learning device 1000 based on the artificial intelligence in accordance with one example embodiment of the present disclosure is described by referring to FIG. 2 as follows.

First, if unlabeled data, which are raw data to be used for training, are acquired, the learning device 1000 may perform or support another device to perform a process of inputting the unlabeled data into an active learning network 100, to thereby allow the active learning network 100 to acquire sub unlabeled data, estimated as hard examples to be used for training an existing learning network, from the unlabeled data. Herein, the existing learning network may have been trained by using existing labeled data.

Herein, the hard examples, which are data useful for training the existing learning network, may be data different from training data which are previously collected and used for training the deep learning network.

And, the active learning network 100 may acquire the sub unlabeled data, i.e., the hard examples, from the unlabeled data by using various algorithms such as uncertainty sampling, Query-by-Committee, Expected-Model-Change, etc.

As one example, by referring to FIG. 3, a process of acquiring the sub unlabeled data from the unlabeled data by the active learning network 100 is described as follows.

The learning device 1000 may perform or support another device to perform a process of inputting the unlabeled data into the active learning network 100, to thereby allow the active learning network 100 to (i) compare first labeling information created from the unlabeled data by the auto labeling network 200 with second labeling information created from the unlabeled data by the existing learning network 400 and thus (ii) acquire specific unlabeled data, corresponding to specific differences, as the sub unlabeled data. Herein, the specific differences, among differences between the first labeling information and the second labeling information, may be equal to or greater than a difference threshold.

That is, the learning device 1000 may input the collected unlabeled data into the active learning network 100.

Then, the active learning network 100 may input the unlabeled data respectively into the auto labeling network 200 and the existing learning network 400.

As a result, the auto labeling network 200 may perform a process of labeling each piece of the unlabeled data, to thereby output each piece of the first labeling information on each piece of the unlabeled data. Herein, each piece of the first labeling information may be each ground truth of each piece of the unlabeled data, and the ground truth may include various information such as area information on an object, class information on the object, class information on a pixel, location information on the object, location information on a point, etc.

And the existing learning network 400 may perform a process of applying at least one learning operation to each piece of the unlabeled data, to thereby output each piece of the second labeling information on each piece of the unlabeled data. Herein, each piece of the second labeling information may be each recognition result of each piece of the unlabeled data, and the recognition result may include various information such as area information on an object, class information on the object, class information on a pixel, location information on the object, location information on a point, etc., in relation to a task to be executed by the existing learning network 400.

Thereafter, the active learning network 100 may perform a process of comparing each piece of the first labeling information with each piece of the second labeling information, to thereby acquire each difference between each piece of the first labeling information and each piece of the second labeling information. If each of the differences is less than the difference threshold, that is, each piece of the first labeling information and each piece of the second labeling information are determined as identical or similar, then its corresponding piece of the unlabeled data is excluded from the training data. And if each of the differences is equal to or greater than the difference threshold, that is, if each piece of the first labeling information is much different from each piece of the second labeling information, then its corresponding piece of the unlabeled data is determined as each of the hard examples and then each of the hard examples may be acquired as the sub unlabeled data.

As another example, by referring to FIG. 4, another process of acquiring the sub unlabeled data from the unlabeled data by the active learning network 100 is described as follows.

The learning device 1000 may perform or support another device to perform (i) a process of converting each piece of the unlabeled data into each piece of first modified unlabeled data to n-th modified unlabeled data respectively via a first modifying procedure to an n-th modifying procedure and (ii) a process of inputting each piece of the first modified unlabeled data to the n-th modified unlabeled data into the active learning network 100, to thereby allow the active learning network 100 to (ii-1) measure each of variances among respective pieces of first modified output information to n-th modified output information created from respective pieces of the first modified unlabeled data to the n-th modified unlabeled data by the existing learning network 400 and (ii-2) acquire the specific unlabeled data, corresponding to specific variances, as the sub unlabeled data. Herein, the specific variances, among the variances, may be equal to or greater than a variance threshold.

Herein, the modifying procedures may include various procedures such as adjusting sizes, changing aspect ratios, changing color tones, etc. of the unlabeled data.

And, the learning device 1000 may input the first modified unlabeled data to the n-th modified unlabeled data into the existing learning network 400.

Then the existing learning network 400 may perform a process of applying the learning operation to each piece of the first modified unlabeled data to the n-th modified unlabeled data, to thereby output each piece of the first modified output information to the n-th modified output information on each piece of the first modified unlabeled data to the n-th modified unlabeled data.

Herein, the first modified output information to the n-th modified output information may be respective recognition results of the first modified unlabeled data to the n-th modified unlabeled data, and the recognition results may include various information such as area information on an object, class information on the object, class information on a pixel, location information on the object, location information on a point, etc., in relation to a task to be executed by the existing learning network 400.

Thereafter, the active learning network 100 may perform (i) a process of measuring each of the variances among respective pieces of the first modified output information to the n-th modified output information, (ii) if at least part of the variances is equal to or greater than the variance threshold, a process of determining said at least part of the variances as the specific variances, and (iii) a process of acquiring each piece of the specific unlabeled data, corresponding to each of the specific variances, as the sub unlabeled data, and a process of excluding remaining unlabeled data, corresponding to the variances less than the variance threshold, from the training data.

Figure 3:
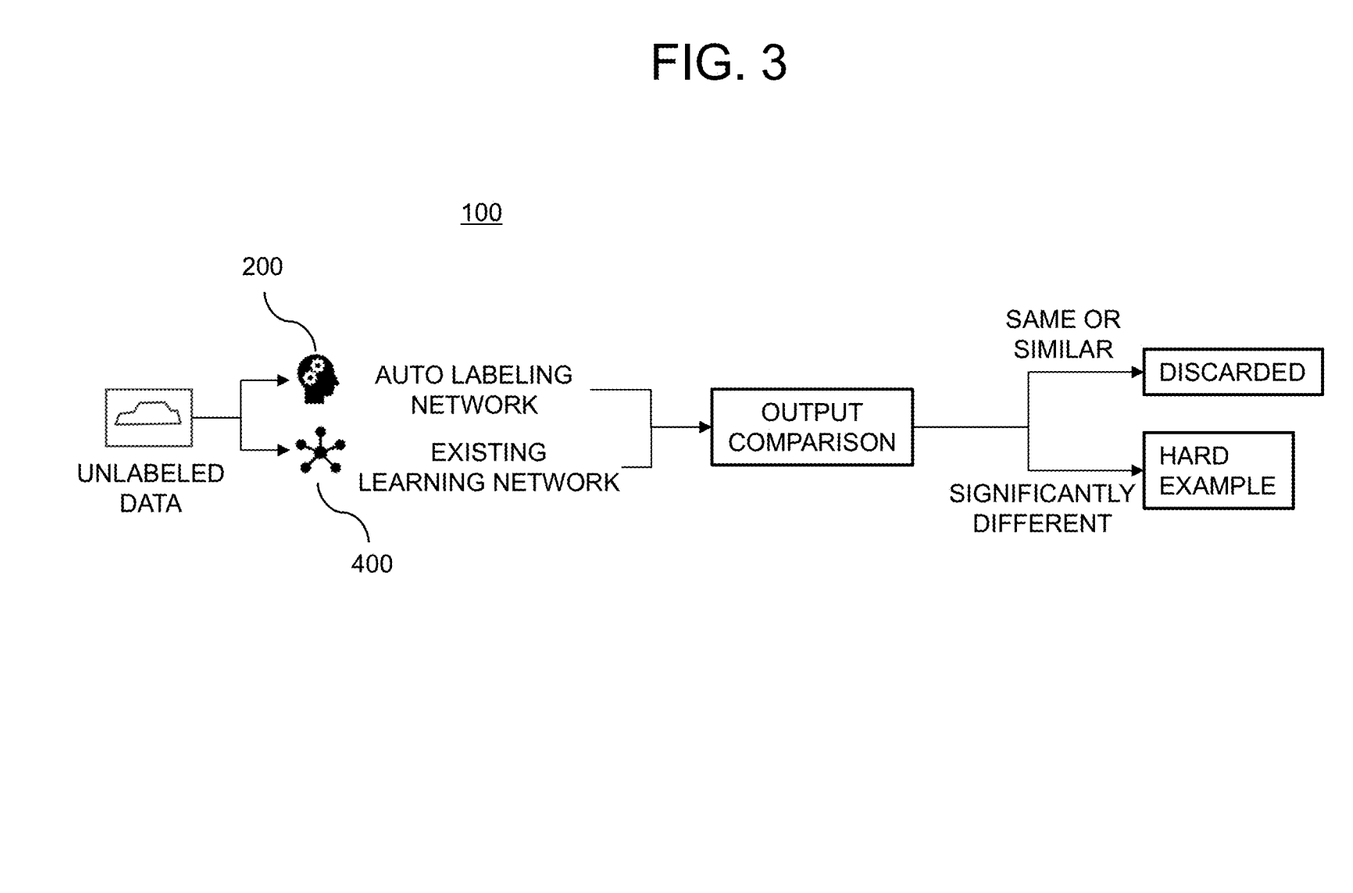
FIG. 3 is a drawing schematically illustrating an operation of an active learning network in the method for training the deep learning network based on the artificial intelligence in accordance with one example embodiment of the present disclosure.
Figure 4:
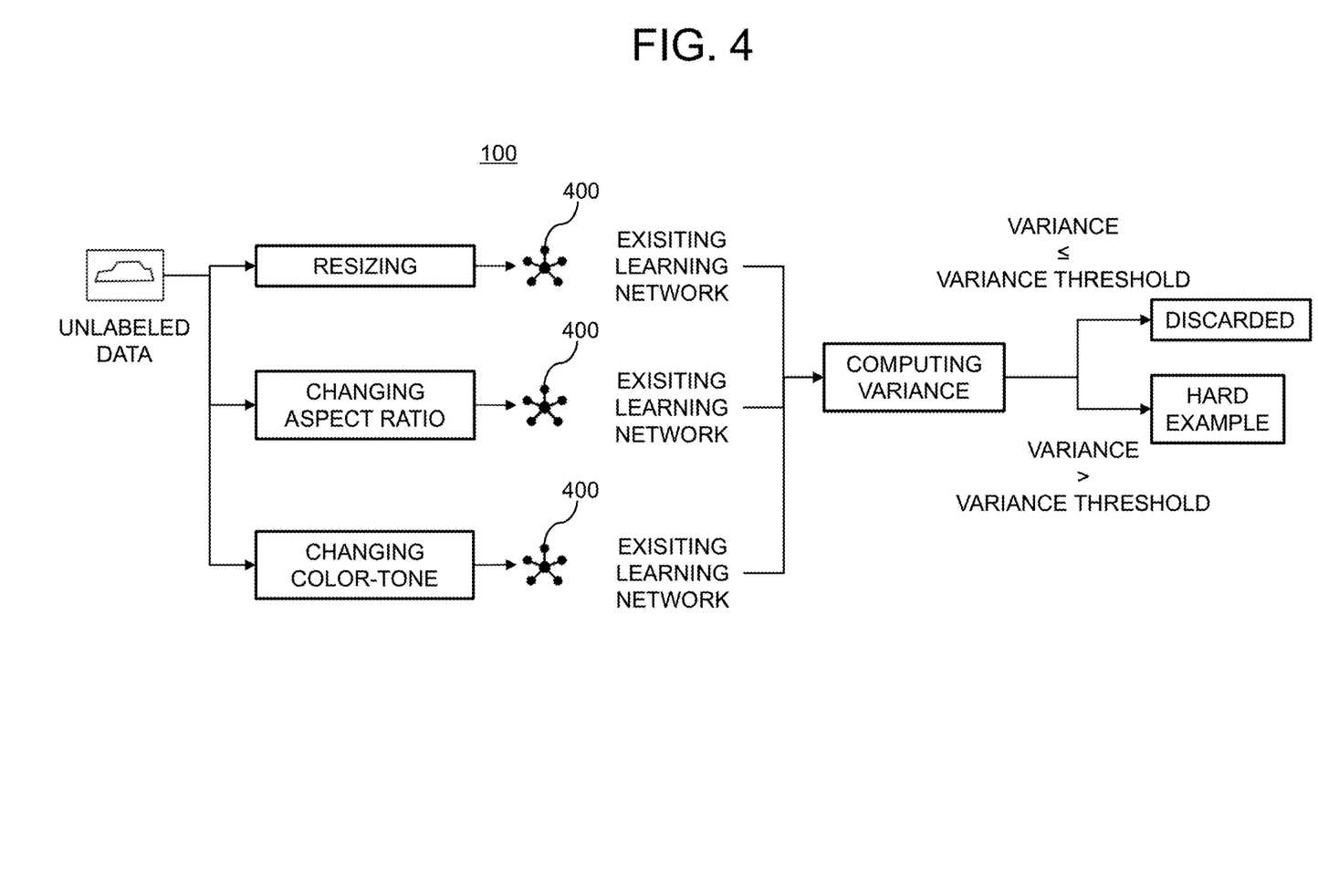
FIG. 4 is a drawing schematically illustrating another operation of the active learning network in the method for training the deep learning network based on the artificial intelligence in accordance with one example embodiment of the present disclosure.

Also, as another example different from examples described by referring to FIGS. 3 and 4, the learning device 1000 may acquire the sub unlabeled data from the unlabeled data by confidence sampling. That is, the learning device 1000 may perform or support another device to perform a process of allowing the active learning network 100 to measure each of confidence scores of each piece of the unlabeled data via the existing learning network 400, to thereby acquire a preset number of pieces of the specific unlabeled data, counted in an increasing order of the confidence scores, as the sub unlabeled data.

Figure 5:
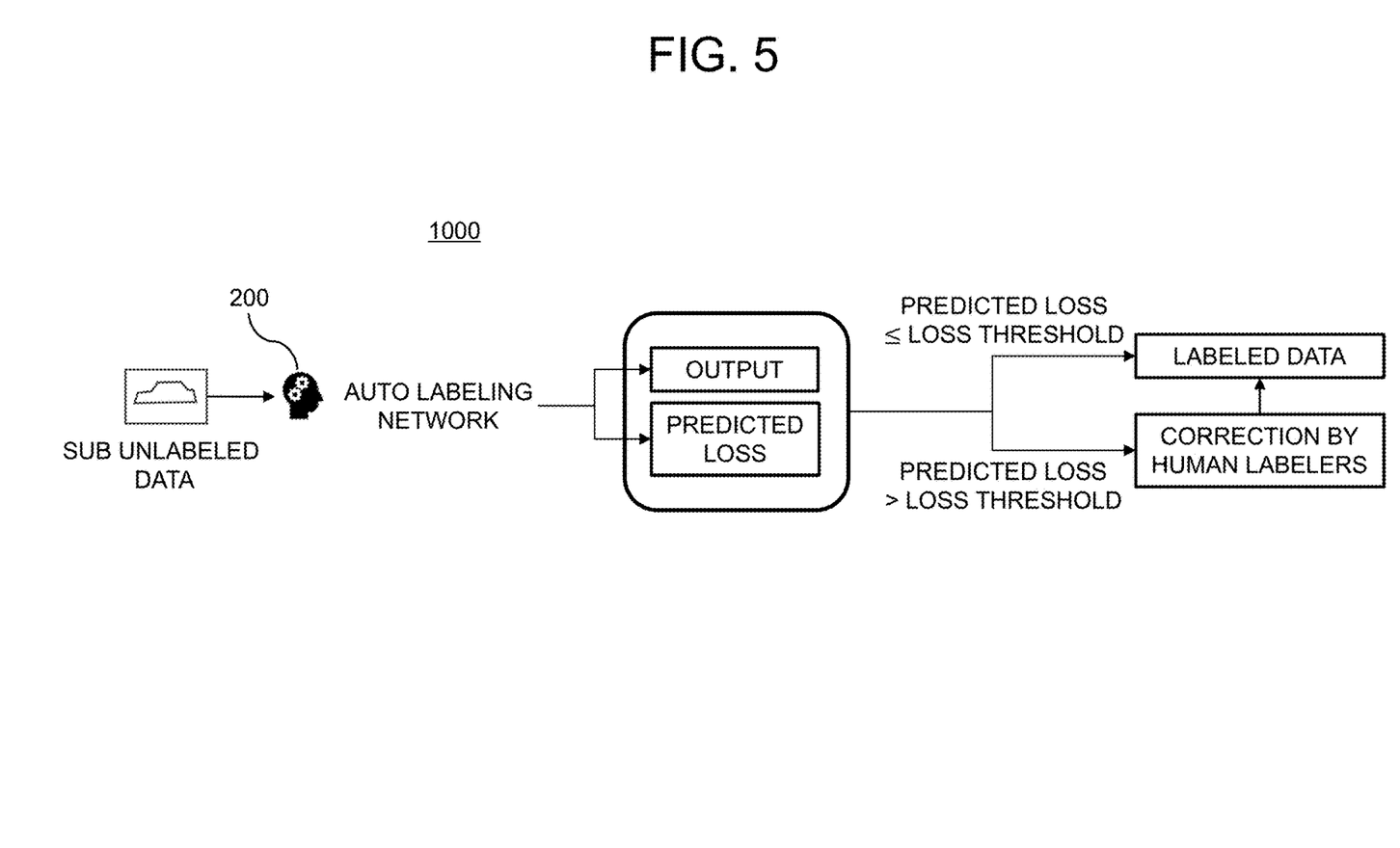
FIG. 5 is a drawing schematically illustrating an operation of an auto labeling network in the method for training the deep learning network based on the artificial intelligence in accordance with one example embodiment of the present disclosure.

Next, the learning device 1000 may input the sub unlabeled data into the auto labeling network 200, to thereby allow the auto labeling network 200 to label each piece of the sub unlabeled data, that is, annotate each piece of the sub unlabeled data, to thereby generate new labeled data.

That is, by referring to FIG. 5, if the sub unlabeled data are inputted by the learning device 1000, the auto labeling network 200 may annotate each piece of the sub unlabeled data, that is, label each piece of the sub unlabeled data in order to create ground truths, to thereby generate intermediate labeled data.

And, the auto labeling network 200 may estimate each of uncertainty scores of each piece of the sub labeled data, to thereby calculate one or more predicted losses.

That is, the auto labeling network 200 may generate labeling information on the sub labeled data, to thereby calculate the predicted losses by referring to the uncertainty scores of the labeling information.

Thereafter, the auto labeling network 200 may (i) compare each of the predicted losses with a loss threshold and (ii) transmit first intermediate labeled data, whose corresponding predicted losses are equal to or greater than the loss threshold, among the intermediate labeled data, to at least one human labeler, to thereby allow the human labeler to verify the transmitted first intermediate labeled data and thus to generate verified labeled data. And, the auto labeling network 200 may acquire (1) the verified labeled data whose labeling information are modified due to the verification by the human labeler and (2) second intermediate labeled data whose predicted losses are less than the loss threshold, as the new labeled data. Meanwhile, as another example from that of the auto labeling network 200, the learning device 1000 may (i) transmit the first intermediate labeled data to the human labeler by referring to the predicted losses and (ii) acquire the verified labeled data and the second intermediate labeled data, as the new labeled data.

Further, the auto labeling network 200 may have been trained to auto-label the unlabeled data.

Figure 6:
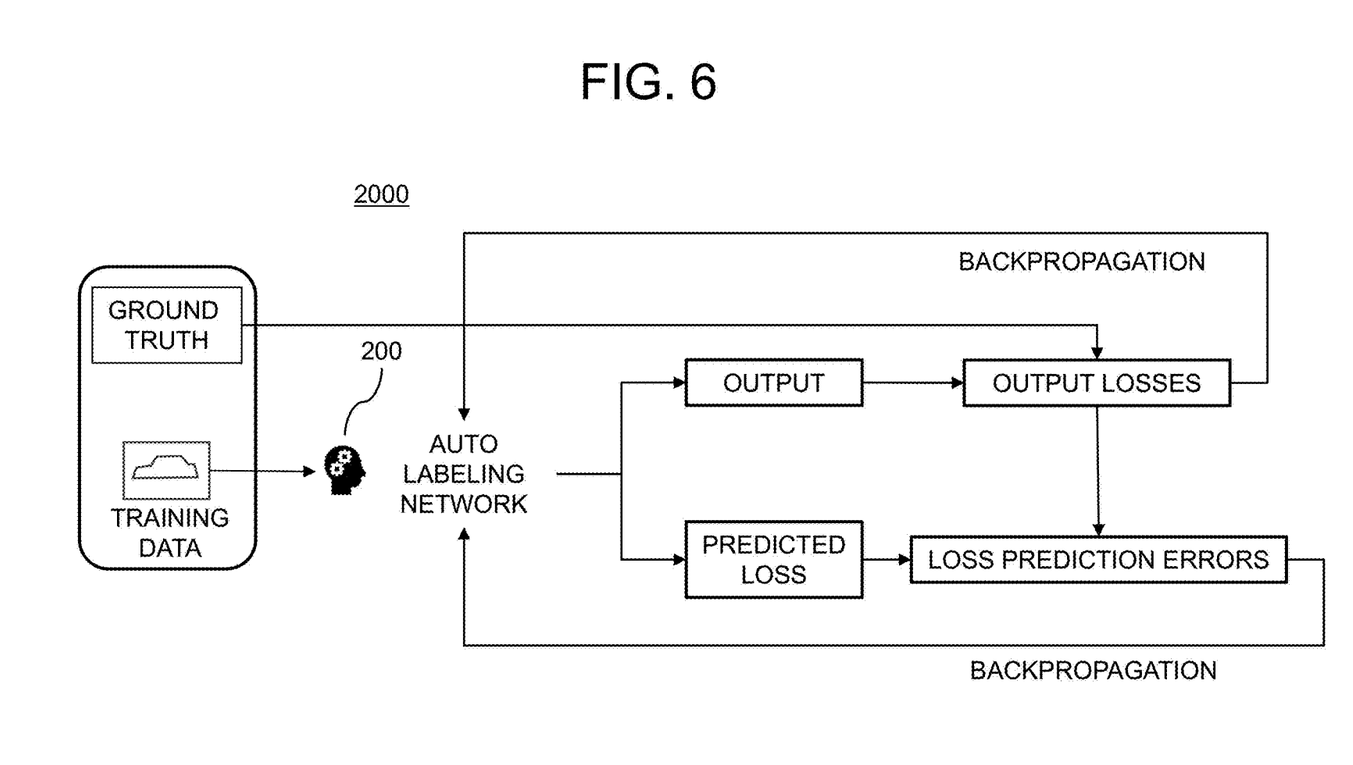
FIG. 6 is a drawing schematically illustrating processes of training the auto labeling network in the method for training the deep learning network based on the artificial intelligence in accordance with one example embodiment of the present disclosure.

As one example, by referring to FIG. 6, if the training data including the ground truths are acquired, the learning device 2000 may input the training data into the auto labeling network 200, to thereby allow the auto labeling network 200 to (1) label the training data and thus generate labeled training data and (ii) estimate each of the uncertainty scores for training on each piece of the training data and thus calculate one or more predicted losses for training. Herein, the learning device 2000 may be a same device as the learning device 1000 for training the deep learning network based on the artificial intelligence or may be a different device for training the auto labeling network 200 only.

And, the learning device 2000 may (i) calculate one or more labeling losses for training by referring to (1) the labeling information of the labeled training data outputted from the auto labeling network 200 and (2) the ground truth corresponding to the labeling information and (ii) calculate one or more loss prediction errors by referring to the predicted losses for training and the labeling losses for training. Then, the learning device 2000 may train the auto labeling network 200 via backpropagation using the labeling losses for training and the loss prediction errors.

Meanwhile, the learning device 1000 may perform or support another device to perform a process of continual learning of the auto labeling network 200 using one or more accuracy losses calculated by referring to the verified labeled data and the first intermediate labeled data. As a result, a performance of the auto labeling network 200 may be improved continuously.

Figure 2:
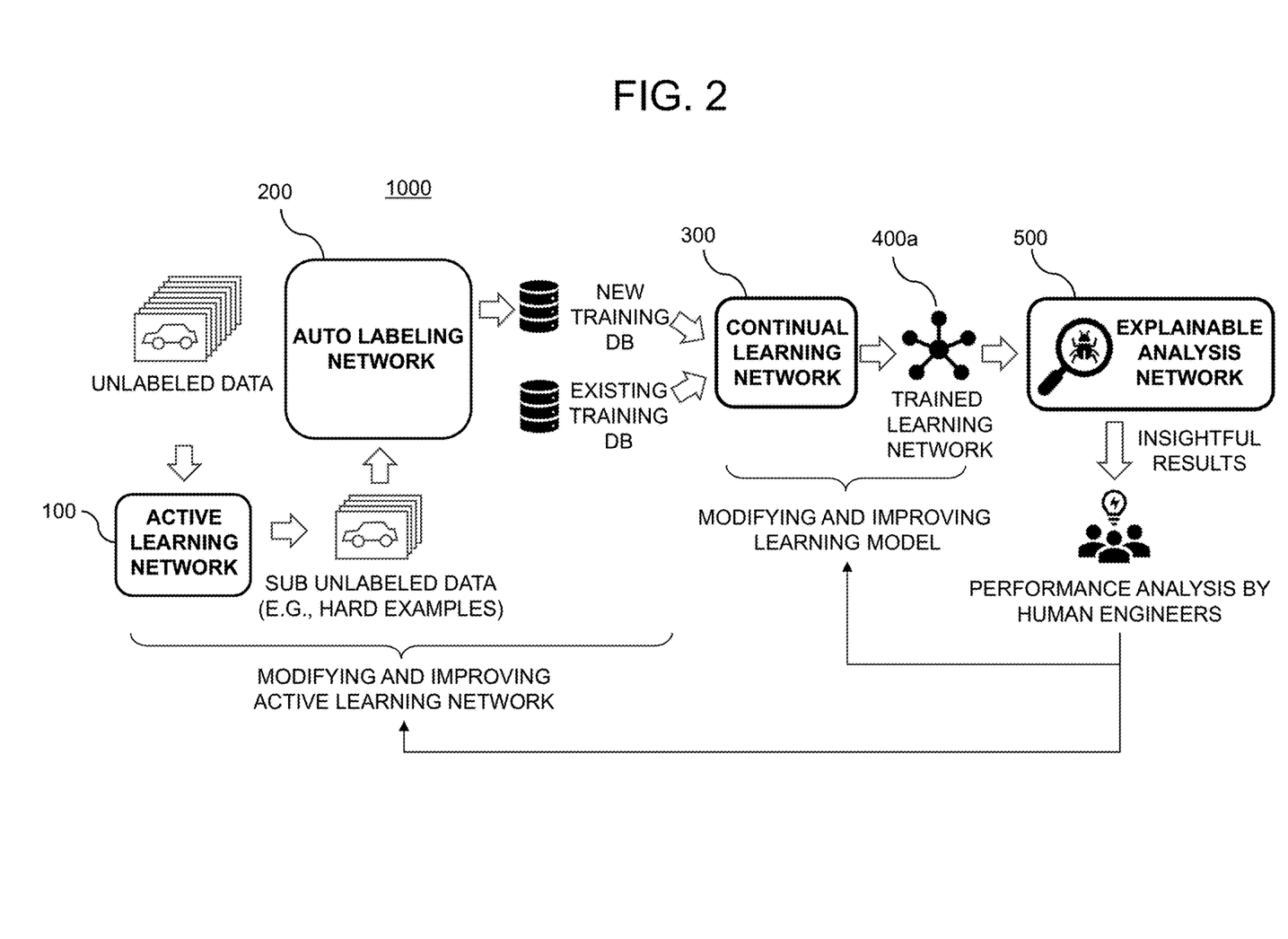
FIG. 2 is a drawing schematically illustrating a method for training the deep learning network based on the artificial intelligence in accordance with one example embodiment of the present disclosure.

Then, the learning device 1000 may perform or support another device to perform a process of allowing a continual learning network 300 to (i) sample the new labeled data and the existing labeled data, to thereby generate a mini-batch including sampled new labeled data and specific sampled existing labeled data and (ii) train the existing learning network 400 by using the mini-batch, to thereby acquire a trained learning network 400A shown in FIG. 2. Herein, the specific sampled existing labeled data may be selected among sampled existing labeled data by referring to a condition of each of specific existing losses corresponding to the specific sampled existing labeled data being equal to or greater than a preset base loss. Also, the existing learning network 400 may create sampled existing output information from the specific sampled existing labeled data. Further, the specific existing losses, among one or more existing losses, may be calculated by referring to the sampled existing output information.

That is, the learning device 1000 may train the existing learning network 400 by using the mini-batch, to thereby acquire the trained learning network 400A, such that the trained learning network 400A delivers a performance similar to that of the existing learning network 400 for the existing labeled data and such that the trained learning network 400A delivers a performance better than that of the existing learning network 400 for the new labeled data. Herein, the existing learning network 400 may be a new learning network, to be used for creating a new deep learning model, not a learning network trained previously.

Figure 7:
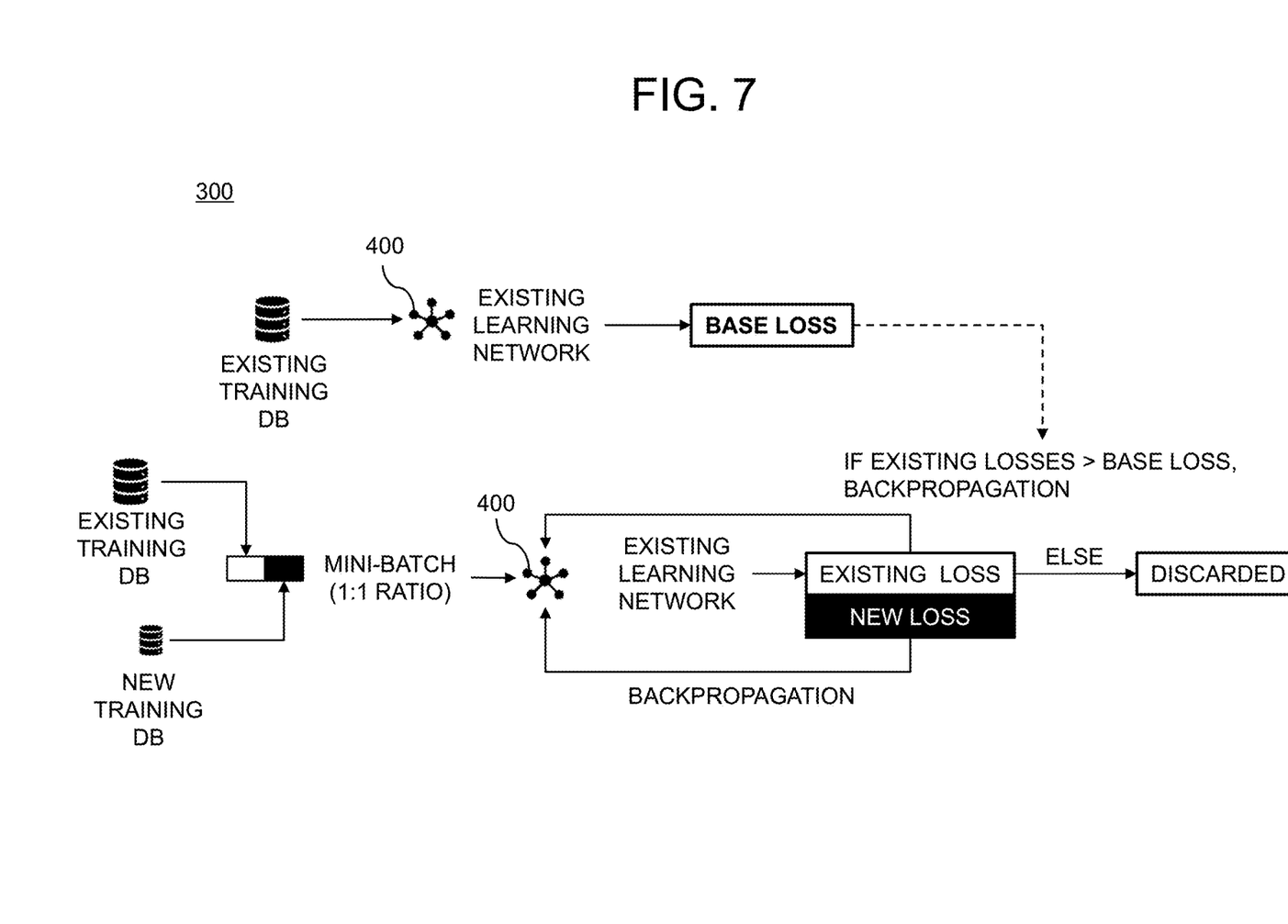
FIG. 7 is a drawing schematically illustrating an operation of a continual learning network in the method for training the deep learning network based on the artificial intelligence in accordance with one example embodiment of the present disclosure.

As one example, by referring to FIG. 7, the continual learning network 300 may input the existing labeled data stored in an existing training database (DB) into the existing learning network 400, to thereby allow the existing learning network 400 to apply the learning operation to the existing labeled data and thus to generate existing output information and may acquire an averaged loss, calculated by averaging the existing losses on the existing output information, as the base loss.

Thereafter, at each iteration for training the existing learning network 400, the continual learning network 300 may sample the new labeled data in a new training database and the existing labeled data in the existing training database, to thereby generate the mini-batch including the sampled new labeled data and the specific sampled existing labeled data. Herein, the continual learning network 300 may sample the new labeled data and the existing labeled data such that a ratio of the number of pieces of the sampled new labeled data to the number of pieces of the specific sampled existing labeled data in the mini-batch is 1:1.

And the continual learning network 300 may input the sampled new labeled data and the specific sampled existing labeled data into the existing learning network 400, to thereby allow the existing learning network 400 to apply the learning operation to the sampled new labeled data and the specific sampled existing labeled data and thus to generate sampled new output information corresponding to the sampled new labeled data and sampled existing output information corresponding to the specific sampled existing labeled data. Herein, the existing learning network 400 may be a new learning network, to be used for creating a new deep learning model, not a learning network trained previously.

And, the continual learning network 300 may calculate one or more new losses by referring to the sampled new output information and their corresponding ground truths and may calculate the existing losses by referring to the sampled existing output information and their corresponding ground truths.

Then, the continual learning network 300 may train the existing learning network 400 by backpropagation using the new losses and the existing losses. In detail, the backpropagation by using the new losses is performed as usual, however, regarding the existing losses, the backpropagation by using only the specific existing losses which are determined as equal to or greater than the base loss is performed, and the backpropagation by using other existing losses which are determined as less than the base loss may not be performed. That is, all of the new labeled data are used for training, and the existing labeled data are used for training only when the performance of the existing learning network 400 is low, therefore the trained learning network 400A may be trained such that the trained learning network 400A delivers the performance similar to that of the existing learning network 400 for the existing labeled data and such that the trained learning network 400A delivers the performance better than that of the existing learning network 400 for the new labeled data.

Next, the learning device 1000 may perform or support another device to perform (i) a process of allowing an explainable analysis network 500 to (i-1) generate insightful results on validation data via the trained learning network 400A and (i-2) transmit the insightful results to at least one human engineer, to thereby allow the human engineer to transmit a performance analysis, created by referring to the insightful results, of the trained learning network 400A to the learning device 1000 and (ii) a process of modifying and improving at least one of the active learning network 100 and the continual learning network 300 by referring to the performance analysis.

That is, the learning device 1000 may (i) input the validation data into the trained learning network 400A, to thereby allow the trained learning network 400A to apply the learning operation to the validation data and thus to generate validation output information and (ii) input the validation output information corresponding to the validation data into the explainable analysis network 500, and thus allow the explainable analysis network 500 to output the insightful results to be used for the performance analysis of the trained learning network 400A by referring to the validation output information. Herein, the learning device 1000 is described as inputting the validation output information into the explainable analysis network 500, however, as another example, the explainable analysis network 500 may input the validation data into the trained learning network 400A, to thereby allow the trained learning network 400A to apply the learning operation to the validation data and thus to generate the validation output information.

Herein, the insightful results created by the explainable analysis network 500 may include an example, e.g., an example of mis-detection or undetection, of a low performance of the trained learning network 400A, a cause, e.g., a region in the input data which had a significant influence on outputs, of the mis-detection or undetection, and features within a mid layer which had a significant influence on the outputs.

Figure 8:
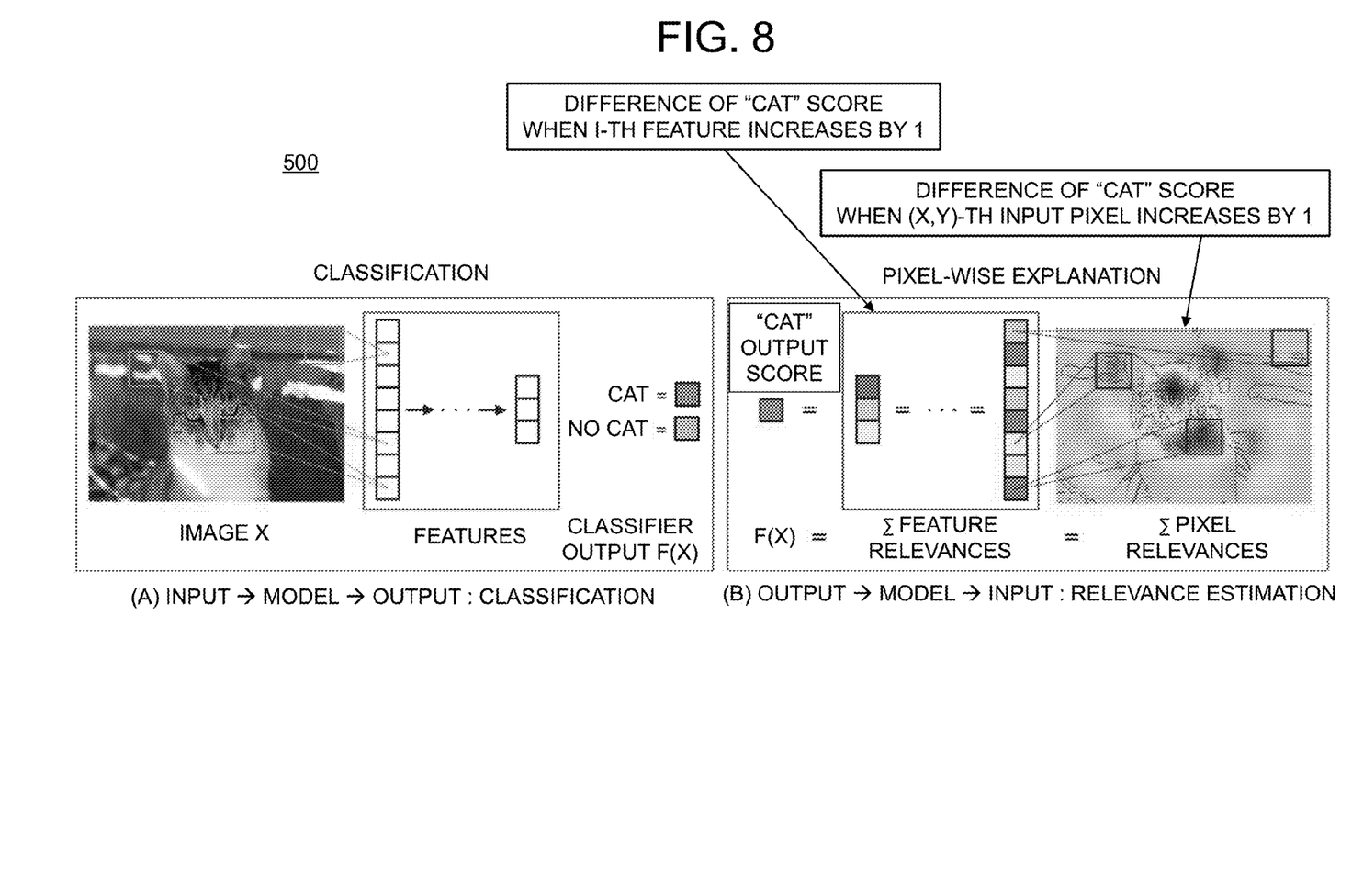
FIG. 8 is a drawing schematically illustrating an operation of an explainable analysis network in the method for training the deep learning network based on the artificial intelligence in accordance with one example embodiment of the present disclosure.

As one example, by referring to (A) of FIG. 8, the validation data may be inputted into the trained learning network 400A, to thereby allow the trained learning network 400A to classify the validation data, and then, by referring to (B) of FIG. 8, the validation output information from the trained learning network 400A may be inputted into the explainable analysis network 500, to thereby allow the explainable analysis network 500 to perform relevance estimation on the validation output information from the trained learning network 400A, and thus to generate pixel-wise explanations. That is, if the validation data is a validation image, for each image pixel, by referring to a feature relevance difference which is a change in a score of "cat" when an i-th feature increases by 1, pixel-wise explanation which is a change in a score of "cat" when an (x, y)-th input pixel on the image increases by 1 may be created, to thereby generate the insightful results. Herein, the "cat" may be a result of classifying the validation image. Meanwhile, as another example, the explainable analysis network 500 may generate the insightful results on the outputs of the trained learning network 400A in various ways other than the relevance estimation above.

Next, the learning device 1000 may transmit the insightful results, created by the explainable analysis network 500, to the human engineers, to thereby allow the human engineers to easily carry out the performance analysis of the trained deep learning network 400A by referring to the insightful results.

And, by referring to the performance analysis created by the human engineers, the learning device 1000 may modify and improve the active learning network 100, and may modify and improve a learning model of the continual learning network 300.

The present disclosure has an effect of extracting hard examples, capable of improving the performance of the deep learning network, from collected raw data and performing data annotation using the extracted hard examples, to thereby improve the return on investment on the data annotation.

The present disclosure has another effect of automatically adjusting an optimal usage ratio of the new training data and the existing training data, to thereby maximize a learning effect of the deep learning network.

The present disclosure has still another effect of providing insightful information to be used for the performance analysis from the outputs of the trained deep learning network, to thereby improve accuracy of the performance analysis by the human engineers and minimize time spent on the performance analysis.

The present disclosure has still yet another effect of minimizing human intervention in training the deep learning network, to thereby reduce cost and time for training the deep learning network.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training a deep learning network based on artificial intelligence, comprising steps of:
    (a) a learning device performing or supporting another device to perform a process of inputting unlabeled data into an active learning network, to thereby allow the active learning network to acquire sub unlabeled data, estimated as hard examples to be used for training an existing learning network, from the unlabeled data wherein the existing learning network has been trained with existing labeled data and a process of inputting the sub unlabeled data into an auto labeling network, to thereby allow the auto labeling network to label each piece of the sub unlabeled data and thus to generate new labeled data;
    (b) the learning device performing or supporting another device to perform a process of allowing a continual learning network to (i) sample the new labeled data and the existing labeled data, to thereby generate a mini-batch including sampled new labeled data and specific sampled existing labeled data, and (ii) train the existing learning network by using the mini-batch, to thereby acquire a trained learning network, wherein the specific sampled existing labeled data are selected among the sampled existing labeled data by referring to a condition of each of specific existing losses corresponding to the specific sampled existing labeled data being equal to or greater than a preset base loss; and
    (c) the learning device performing or supporting another device to perform (i) a process of allowing an explainable analysis network to (i-1) generate insightful results on validation data via the trained learning network and (i-2) transmit the insightful results to at least one human engineer, to thereby allow the human engineer to transmit an analysis, created by referring to the insightful results, of the trained learning network to the learning device and (ii) a process of modifying and improving at least one of the active learning network and the continual learning network by referring to the analysis.

2. The method of claim 1, wherein, at the step of (a), the learning device performs or supports another device to perform a process of allowing the auto labeling network to (i) label each piece of the sub unlabeled data, to thereby generate intermediate labeled data, (ii) estimate each of uncertainty scores of each piece of the sub labeled data, to thereby calculate one or more predicted losses, (iii) transmit first intermediate labeled data, whose corresponding predicted losses are equal to or greater than a loss threshold, among the intermediate labeled data to at least one human labeler, to thereby allow the human labeler to verify the transmitted first intermediate labeled data and thus to generate verified labeled data, and (iv) acquire the verified labeled data and second intermediate labeled data, whose predicted losses are less than the loss threshold, as the new labeled data.

3. The method of claim 2, wherein the learning device has performed or supported another device to perform (i) a process of inputting training data into the auto labeling network, to thereby allow the auto labeling network to (i-1) label the training data and thus generate labeled training data and (i-2) estimate each of uncertainty scores for training on each piece of the training data and thus calculate one or more predicted losses for training and (ii) a process of backpropagating (1) one or more labeling losses for training calculated by referring to the labeled training data and their corresponding ground truths and (2) one or more loss prediction errors created by referring to differences between the labeling losses for training and their corresponding predicted losses for training, to thereby train the auto labeling network.

4. The method of claim 2, wherein the learning device performs or supports another device to perform a process of continual learning of the auto labeling network using one or more accuracy losses calculated by referring to the verified labeled data and the first intermediate labeled data.

5. The method of claim 1, wherein, at the step of (b), on condition that an averaged loss, calculated by averaging one or more existing losses on existing output information, has been acquired as the base loss and wherein the existing learning network creates the existing output information from the existing labeled data, the learning device performs or supports another device to perform a process of allowing the continual learning network to (i) generate the mini-batch such that a ratio of the number of pieces of the sampled new labeled data to the number of pieces of the specific sampled existing labeled data is 1:1 and (ii) (ii-1) train the existing learning network using all of new losses calculated by referring to sampled new output information wherein the existing learning network creates the sampled new output information from the sampled new labeled data and (ii-2) train the existing learning network only using the specific existing losses, wherein the specific existing losses, among the existing losses, are calculated by referring to sampled existing output information and wherein the existing learning network creates the sampled existing output information from the specific sampled existing labeled data.

6. The method of claim 1, wherein, at the step of (c), the learning device performs or supports another device to perform a process of allowing the explainable analysis network to execute relevance estimation of validation output information created from the validation data by the trained learning network and thus to generate pixel-wise explanations, to thereby acquire the pixel-wise explanations as the insightful results.

7. The method of claim 1, wherein, at the step of (a), the learning device performs or supports another device to perform a process of allowing the active learning network to (i) compare first labeling information created from the unlabeled data by the auto labeling network with second labeling information created from the unlabeled data by the existing learning network and thus (ii) acquire specific unlabeled data, corresponding to specific differences, as the sub unlabeled data wherein the specific differences, among differences between the first labeling information and the second labeling information, are equal to or greater than a difference threshold.

8. The method of claim 1, wherein, at the step of (a), the learning device performs or supports another device to perform (i) a process of converting each piece of the unlabeled data into each piece of first modified unlabeled data to n-th modified unlabeled data respectively via a first modifying procedure to an n-th modifying procedure and (ii) a process of inputting each piece of the first modified unlabeled data to the n-th modified unlabeled data into the active learning network, to thereby allow the active learning network to (ii-1) measure each of variances among respective pieces of first modified output information to n-th modified output information created from respective pieces of the first modified unlabeled data to the n-th modified unlabeled data by the existing learning network and (ii-2) acquire specific unlabeled data, corresponding to specific variances, as the sub unlabeled data wherein the specific variances, among the variances, are equal to or greater than a variance threshold.

9. The method of claim 1, wherein, at the step of (a), the learning device performs or supports another device to perform a process of allowing the active learning network to measure each of confidence scores of each piece of the unlabeled data via the existing learning network, to thereby acquire a preset number of pieces of specific unlabeled data, counted in an increasing order of the confidence scores, as the sub unlabeled data.

10. A learning device for training a deep learning network based on artificial intelligence, comprising:
at least one memory that stores instructions; and
at least one processor configured to execute the instructions to perform or support another device to perform:
(I) a process of inputting unlabeled data into an active learning network, to thereby allow the active learning network to acquire sub unlabeled data, estimated as hard examples to be used for training an existing learning network, from the unlabeled data wherein the existing learning network has been trained with existing labeled data and a process of inputting the sub unlabeled data into an auto labeling network, to thereby allow the auto labeling network to label each piece of the sub unlabeled data and thus to generate new labeled data, (II) a process of allowing a continual learning network to (i) sample the new labeled data and the existing labeled data, to thereby generate a mini-batch including sampled new labeled data and specific sampled existing labeled data, and (ii) train the existing learning network by using the mini-batch, to thereby acquire a trained learning network, wherein the specific sampled existing labeled data are selected among the sampled existing labeled data by referring to a condition of each of specific existing losses corresponding to the specific sampled existing labeled data being equal to or greater than a preset base loss, and (III) (i) a process of allowing an explainable analysis network to (i-1) generate insightful results on validation data via the trained learning network and (i-2) transmit the insightful results to at least one human engineer, to thereby allow the human engineer to transmit an analysis, created by referring to the insightful results, of the trained learning network to the learning device and (ii) a process of modifying and improving at least one of the active learning network and the continual learning network by referring to the analysis.

11. The learning device of claim 10, wherein, at the process of (I), the processor performs or supports another device to perform a process of allowing the auto labeling network to (i) label each piece of the sub unlabeled data, to thereby generate intermediate labeled data, (ii) estimate each of uncertainty scores of each piece of the sub labeled data, to thereby calculate one or more predicted losses, (iii) transmit first intermediate labeled data, whose corresponding predicted losses are equal to or greater than a loss threshold, among the intermediate labeled data to at least one human labeler, to thereby allow the human labeler to verify the transmitted first intermediate labeled data and thus to generate verified labeled data, and (iv) acquire the verified labeled data and second intermediate labeled data, whose predicted losses are less than the loss threshold, as the new labeled data.

12. The learning device of claim 11, wherein the processor has performed or supported another device to perform (i) a process of inputting training data into the auto labeling network, to thereby allow the auto labeling network to (i-1) label the training data and thus generate labeled training data and (i-2) estimate each of uncertainty scores for training on each piece of the training data and thus calculate one or more predicted losses for training and (ii) a process of backpropagating (1) one or more labeling losses for training calculated by referring to the labeled training data and their corresponding ground truths and (2) one or more loss prediction errors created by referring to differences between the labeling losses for training and their corresponding predicted losses for training, to thereby train the auto labeling network.

13. The learning device of claim 11, wherein the processor performs or supports another device to perform a process of continual learning of the auto labeling network using one or more accuracy losses calculated by referring to the verified labeled data and the first intermediate labeled data.

14. The learning device of claim 10, wherein, at the process of (II), on condition that an averaged loss, calculated by averaging one or more existing losses on existing output information, has been acquired as the base loss and wherein the existing learning network creates the existing output information from the existing labeled data,
the processor performs or supports another device to perform a process of allowing the continual learning network to (i) generate the mini-batch such that a ratio of the number of pieces of the sampled new labeled data to the number of pieces of the specific sampled existing labeled data is 1:1 and (ii) (ii-1) train the existing learning network using all of new losses calculated by referring to sampled new output information wherein the existing learning network creates the sampled new output information from the sampled new labeled data and (ii-2) train the existing learning network only using the specific existing losses, wherein the specific existing losses, among the existing losses, are calculated by referring to sampled existing output information and wherein the existing learning network creates the sampled existing output information from the specific sampled existing labeled data.

15. The learning device of claim 10, wherein, at the process of (III), the processor performs or supports another device to perform a process of allowing the explainable analysis network to execute relevance estimation of validation output information created from the validation data by the trained learning network and thus to generate pixel-wise explanations, to thereby acquire the pixel-wise explanations as the insightful results.

16. The learning device of claim 10, wherein, at the process of (I), the processor performs or supports another device to perform a process of allowing the active learning network to (i) compare first labeling information created from the unlabeled data by the auto labeling network with second labeling information created from the unlabeled data by the existing learning network and thus (ii) acquire specific unlabeled data, corresponding to specific differences, as the sub unlabeled data wherein the specific differences, among differences between the first labeling information and the second labeling information, are equal to or greater than a difference threshold.

17. The learning device of claim 10, wherein, at the process of (I), the processor performs or supports another device to perform (i) a process of converting each piece of the unlabeled data into each piece of first modified unlabeled data to n-th modified unlabeled data respectively via a first modifying procedure to an n-th modifying procedure and (ii) a process of inputting each piece of the first modified unlabeled data to the n-th modified unlabeled data into the active learning network, to thereby allow the active learning network to (ii-1) measure each of variances among respective pieces of first modified output information to n-th modified output information created from respective pieces of the first modified unlabeled data to the n-th modified unlabeled data by the existing learning network and (ii-2) acquire specific unlabeled data, corresponding to specific variances, as the sub unlabeled data wherein the specific variances, among the variances, are equal to or greater than a variance threshold.

18. The learning device of claim 10, wherein, at the process of (I), the processor performs or supports another device to perform a process of allowing the active learning network to measure each of confidence scores of each piece of the unlabeled data via the existing learning network, to thereby acquire a preset number of pieces of specific unlabeled data, counted in an increasing order of the confidence scores, as the sub unlabeled data.

* * * * *